United States Patent
Gruchala et al.

(10) Patent No.: US 8,503,628 B2
(45) Date of Patent: *Aug. 6, 2013

(54) PARTY INFORMATION FOR DATA-CAPABLE COMMUNICATION DEVICE

(71) Applicant: AT&T Intellectual Property I, L.P., Atlanta, GA (US)

(72) Inventors: Carol Shifrin Gruchala, Naperville, IL (US); Wayne Robert Heinmiller, Elgin, IL (US); Dianne I Tiliks Kanne, Palatine, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,371

(22) Filed: Nov. 29, 2012

(65) Prior Publication Data
US 2013/0165087 A1 Jun. 27, 2013

Related U.S. Application Data

(63) Continuation of application No. 12/245,501, filed on Oct. 3, 2008, now Pat. No. 8,363,799.

(51) Int. Cl.
*H04M 11/00* (2006.01)
(52) U.S. Cl.
USPC ............... 379/93.17; 379/88.11; 379/142.06
(58) Field of Classification Search
USPC .......................................... 379/93.17, 142.06
See application file for complete search history.

(56) References Cited

U.S. PATENT DOCUMENTS 6,853,711 B2 * 2/2005 Brisebois et al. ........ 379/142.06
7,269,249 B2 * 9/2007 Woodring .................. 379/93.17

OTHER PUBLICATIONS

Notice of allowance dated Sep. 18, 2012 for U.S. Appl. No. 12/245,501, 19 pages.
OA dated Mar. 13, 2012 for U.S. Appl. No. 12/245,501, 19 pages.

* cited by examiner

*Primary Examiner* — Mohammad Islam
*Assistant Examiner* — Van D Huynh
(74) *Attorney, Agent, or Firm* — Turocy & Watson, LLP

(57) ABSTRACT

Detailed information about a party can be provided during interparty communication. Data-capable mobile devices query at least a public database to retrieve information about a set of parties engaged in communication. The results of the database query are employed to provide detailed caller identification and detail functionality to telephones or communication devices not utilizing traditional landlines or commercial caller identification service. Storage can be included to include address book function, query caching, and user preferences. An interface can be provided to facilitate display of rich caller identification information. The interface can further update displayed information without user input, or provide user selection control to request more information on a selected portion of displayed information. These features can be applied to determine the information about a party that is either receiving a communication or initiating a communication.

19 Claims, 12 Drawing Sheets

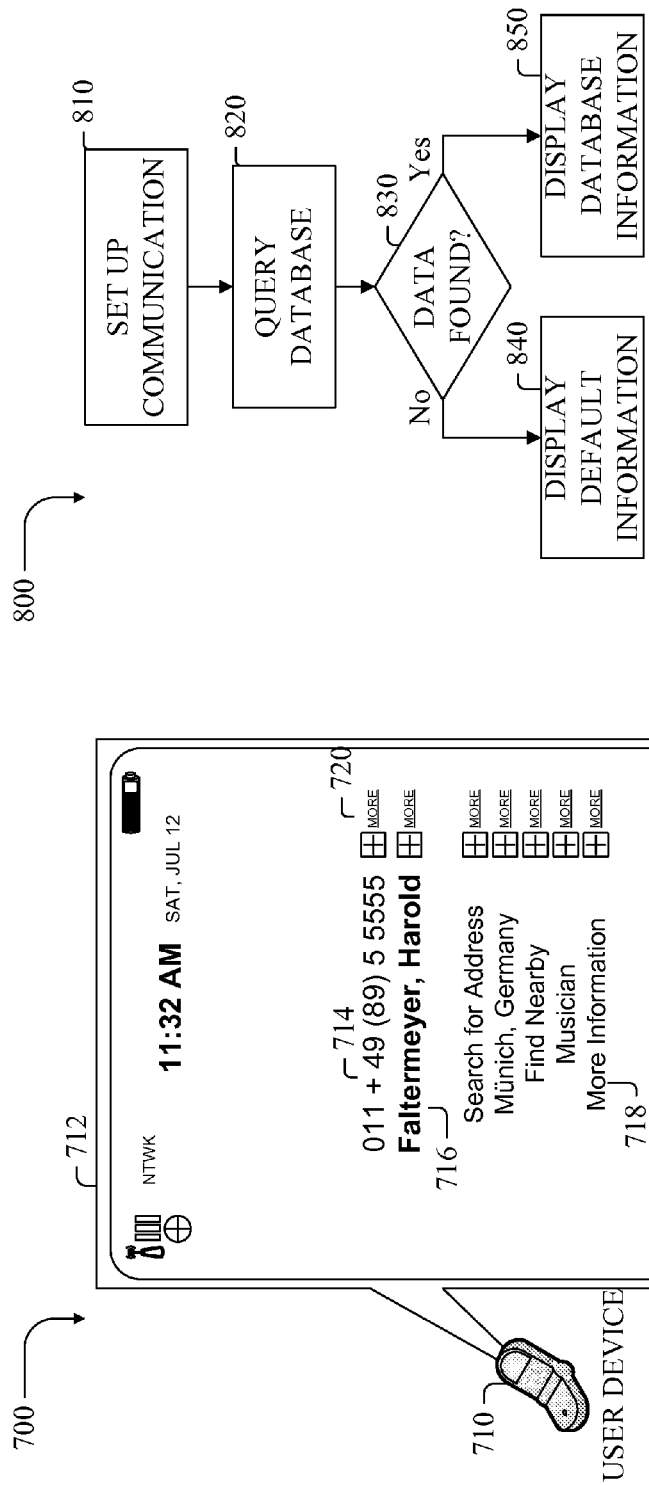

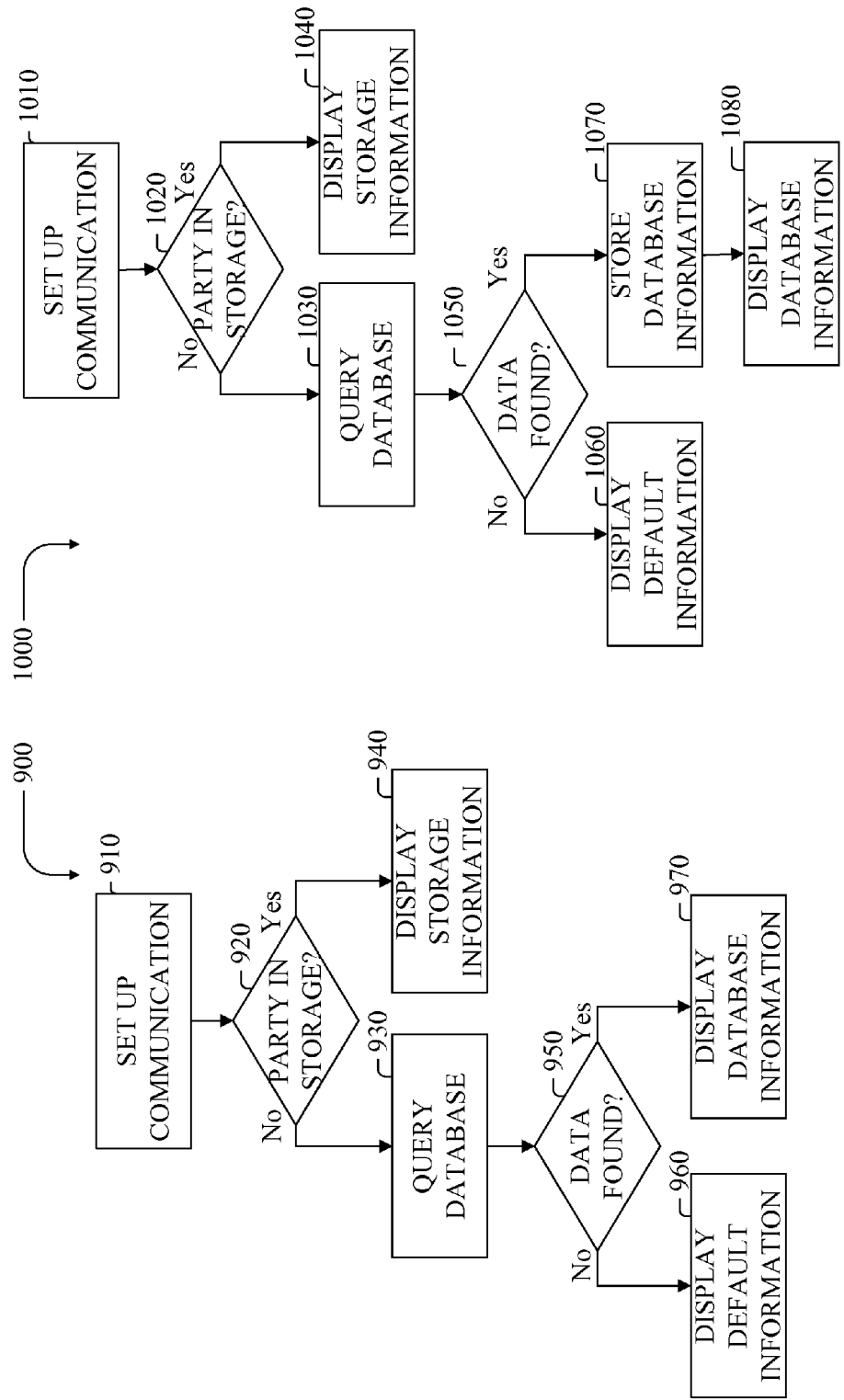

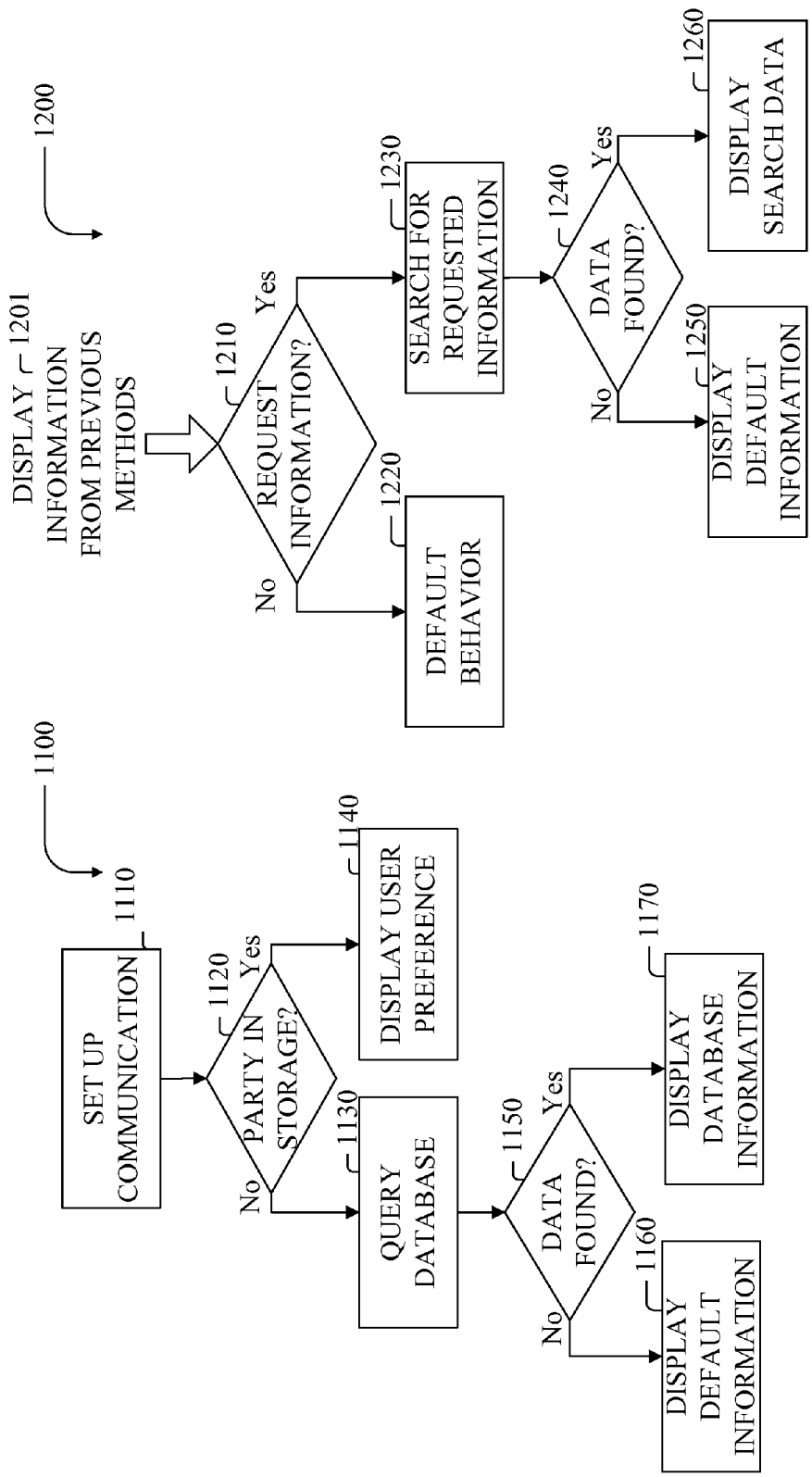

PARTY INFORMATION FOR DATA-CAPABLE COMMUNICATION DEVICE

RELATED APPLICATION

This application claims priority to and is a continuation of U.S. patent application Ser. No. 12/245,501, filed Oct. 3, 2008, entitled "PARTY INFORMATION FOR DATA-CAPABLE COMMUNICATION DEVICE," the entirety of which application is incorporated herein by reference.

FIELD

The following description relates generally to telephone communications, and more particularly to providing a name or other information related to a party in communication.

BACKGROUND

Consumers have a variety of options relating to telephone systems. While many users maintain traditional hardwired telephone lines, cellular telephones have become nearly ubiquitous and alternatives to traditional landlines (for example, Voice over Internet Protocol (VOIP), Session Initiation Protocol (SIP)) are becoming increasingly popular.

The enlarged role of computer technology in telephones has also increased the capability and flexibility of telecommunications today. Some telephone lines are serviced exclusively using an internet connection. Many mobile devices are data-capable, and can send and receive a variety of content utilizing multiple protocols such as Short Message Service or an Internet connection. By incorporating this technology, cellular and digital phone services have in many respects surpassed the functionality of conventional landlines.

Despite these developments, traditional landlines still realize some advantages over more modern telephone systems. One such advantage relates to Caller Identification, which displays the caller's telephone number to a user receiving a call. In addition to the dialer's telephone number, traditional landline systems can also display the Calling Name, or a textual title for the number originating the call. This requires a service provider to provide this information, often from a proprietary database of telephone numbers and corresponding names. Even where such resources are available, some administrators or users can block information relating to a number, or information beyond the number itself can be unavailable at the time of a call. Moreover, where an operator of a cellular device or VOIP phone originates communication, further information about the target party can be useful and could aid the operator in remembering the nature of a communication (for example, in a call log) when no further information was actively stored.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with providing information relating to communication to operators of data-capable telephones. According to one aspect, a device can query a database to determine a name associated with a telephone number. The determined name can be displayed to the user as would a Calling Name from Caller Identification on a traditional landline. Other data imputed from identification of other parties or their contact information can be displayed as well.

In one embodiment, a system can display information to a user of a data-enabled telephone receiving a call. When a user device participates in communication, a database is queried with the originating number using a data gateway on the telephone network. The database returns relevant information, if any, for display on the user device.

In particular embodiments, a user device receiving a call can display relevant information associated with the originating number, and a user device placing a call can display relevant information associated with the target number. This technique is extensible to all means of communication enabled via the user device. For example, party information can be retrieved in response to an SMS text message, mixed-content message, or e-mail. To facilitate speed, redundancy, and flexibility, information can be requested or returned by any communication means available to the user device, and is not limited to the same means by which the communication was received or the database was queried.

Some embodiments can interrogate an individual user address book, which can reside on the user device or in a remote location, before or at substantially the same time of querying a database. The user's personal designation for the call originator or recipient (e.g., nicknames) can supersede use of information returned via another database query. A user can opt-in or opt-out of service for further information on other call members. When further information is returned via a database query, such information can be cached or stored on the user device or in a remote location. The user can choose to save cached information by adding such information to their local or remote address book, or in an additional personal database. Further information relating to a communication party can be a conduit for further data, as a device can request additional information on any subject presented consequent to the initial query.

To the accomplishment of the foregoing and related ends, the subject innovation comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

FIG. 7 shows an example of a display interface which facilitates information management and display with a system disclosed herein.

FIG. 8 shows a block diagram illustrating a general method to practice aspects of the subject application.

FIG. 9 shows a block diagram illustrating a method to practice aspects of the subject application employing storage on a user device.

FIG. 10 shows a block diagram illustrating a method to practice aspects of the subject application employing storage on a user device.

FIG. 11 shows a block diagram illustrating a method to practice aspects of the subject application employing user display preferences.

FIG. 12 shows a block diagram illustrating a method to practice aspects of the subject application facilitating access to additional information.

DETAILED DESCRIPTION

Figure 1:
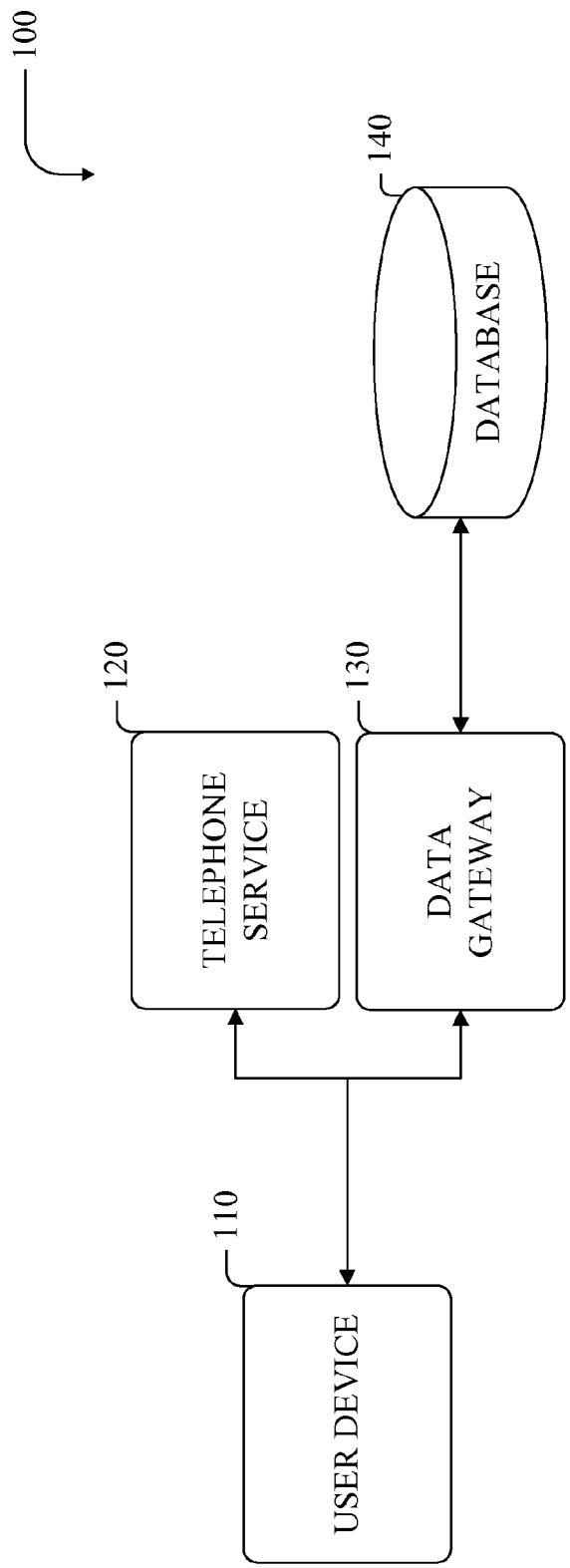
FIG. 1 shows general components and infrastructure utilized in an embodiment of a system disclosed herein.

The subject innovation is now described with reference to the drawings, wherein like reference numerals are used to refer to like elements throughout. In the following description, for purposes of explanation, numerous specific details are set forth in order to provide a thorough understanding of the claimed subject matter. It can be evident, however, that such matter can be practiced without these specific details. Alternatively, such matter can be practiced with supplementary elements, where such elements are known in the art and readily added or substituted. In other instances, well-known structures and devices are shown in block diagram form in order to facilitate describing the innovation.

A party information component can be employed to manage information at least in part relating to a party with which an operator of a device is in communication with. The party information component can be realized through software, hardware, or a combination of both. In some embodiments, the user device can store or control the party information component. For example, the party information component can be a component of a cellular telephone. In another example, the party information component is not a component of the cellular telephone, but the cellular telephone can initiate use of the party information component located elsewhere. In other embodiments, the party information component can exist on any component within the communications network, or can be distributed across or between two or more components. For example, the party interface component can exist on a base station, and immediately seek information about communication parties to transmit to the user device while the communication is simultaneously being relayed and established.

In one or more embodiments, the party information component is utilized to determine identifying information about a party engaged in communication. In additional or alternative embodiments, such identifying information is used as at least a portion of a query of a database to determine more information (e.g., name and title, address and geography, other contact information, profession, employer, associations (e.g., groups, known contacts, common characteristics, proximity, et cetera), relations (logical relations, friends, family, coworkers, peers, network contacts, et cetera), biographical elements, and any other corresponding information stored in a database) about the party engaged in communication. More information about another party can be the Calling Name (CNAM) as presented in standard caller identification. To find this information, the party information component can include resources relating to a Line Information Database (LIDB) and an Intelligent Network (IN) or Advanced Intelligent Network (AIN), but unlike conventional information resources, is not limited to such means when returning party information. One or more embodiments can employ the party information component to manage the information to be queried. In addition, the party information component can manage the results of the database query. Managing results of a database query is dependent upon components available in a particular embodiment and can include (but is not limited to) receiving, re-transmitting or forwarding, formatting, displaying, converting, analyzing, comparing, truncating, parsing, sorting, and interpreting query results. In embodiments where the party information component re-transmits or forwards query results, those results can be handed to another component to facilitate the above and other management tasks. In embodiments where the party information component formats query results, the query results can be prepared or altered for display in accordance with at least one of user device capabilities and aesthetic preferences. In some embodiments, the party information component can utilize user input or usage history to select particular information to present or order specific information from query results. Similarly, in some embodiments, the party information component can utilize user input or usage history to override, remove or reorder query results, and perform a default or specified action. Some embodiments performing multiple queries can utilize the party information component to compare information from multiple queries to determine importance or veracity of specific query result content. In some embodiments, the party information component can be toggled on or off. The party information component or any other feature of an associated system can include an opt-in/opt-out aspect that can be determined at the time of purchase, activation, or any later time.

In addition, some embodiments can utilize the party information component on multiple networks or with multiple means of data exchange. The party information component can also function in combination with multiple databases. In some instances, the party information component can select or deselect particular communication channels or databases with which to operate.

In some embodiments, the party information component can manage information to present additional information relating to data earlier presented to an operator of a user device. In some embodiments, relevant further information can be stored from an earlier query for recall or display when further information is sought. An operator of a user device can select, toggle or otherwise offer input to commence retrieval of further information, or the party information component can retrieve further information without user action. Further or additional information can include greater detail about one or more of identifying information relating to another party to a communication and an item retrieved from an earlier query, including but not limited to phone numbers and extensions thereof such as area codes, as well as information about associated or nearby numbers; physical addresses and extensions thereof such as zip codes, as well as information about the location or points of interest nearby; electronic addresses and extensions thereof such as domains, gateways, hardware addresses or identifiers and networks; messaging names and related information such as service information; information about an individual and their relations, an organization and its associations, or generally relevant to an entity of interest; and other information about items displayed or queried in response to a communication. The previous examples of possible additional and further information are not intended to be an exhaustive list of options, but are illustrative of the sort of data a user might commonly seek in response to communication.

The party information component can also facilitate caching in some embodiments. In one embodiment, all query results can be cached on the user device. In other embodiments, query results can be cached in a remote location separate from the device, or partially cached in a distributed fashion on several components or devices. In another embodiment, a cache can be or act as a database to be queried. Some embodiments can employ a separate history, through which an operator of a user device can browse. History items can be selected to facilitate persistence of specific query results in a user device store (e.g., commit to entry of address book, save to media card, add to database on remote drive, et cetera).

Display and utilization of information managed by the party information component can be improved with an information interface component. In some embodiments, the party interface component can facilitate or be operable in conjunction with such the information interface component. In some embodiments, the party information component and information interface component can be dynamic and interactive, facilitating retrieval of further information on a topic or issue presented by the display. In some embodiments, the information interface component can change or update the displayed information to convey additional information to an operator of a user device without requiring input or a state change.

In some embodiments the information interface component can leverage the native display and control functionality of a device or component. In other embodiments, the information interface component can be a standalone or nonresident component used in conjunction with a device or infrastructure. The information interface component can display information retrieved by the party information component. The information interface component can aid the party information component in preparing content for display, or prepare such content independently. In some embodiments, the information interface component can display static content, dynamic content, and any combination thereof.

The information interface component can facilitate user interaction with displayed information. In some embodiments, the information interface component can allow a user or system to request more information about displayed content. The information interface component can allow selection or manipulation of displayed content in a fashion similar to that employed by a device used in conjunction with the information interface component. In some embodiments, the information interface component can utilize its own control scheme which is different from that employed by a device used in conjunction with the information interface component.

One or more embodiments can employ a query component to perform database queries. The query component utilizes known information relating to a communication party to perform a query of one or more databases to discover information about the communication party. The query results are returned to the party information component or another component for managing such results. The query component can also perform subsequent queries to discover additional information about the communication party, test the veracity of known information about the communication party, or search for further information relating to items already displayed on a communication device. The query component may query substantially any available database by substantially any communication means or combination of communication means available.

The query component can be co-located with the party information component and information interface component, or can be embodied on another component within the communication path. Several query components can exist (e.g., one embodied in a mobile device and one embodied in a base station) where such redundancy would benefit an embodiment. The query component can perform a database query prior to setting up communication, once communication is established, after communication, or at substantially any time. The query component can perform multiple queries at once, or can perform additional queries after one is complete. Initial or subsequent queries can be commenced with our without user input, or with or without a state change in the device or data.

Turning now to the figures, FIG. 1 illustrates an example system 100 that can return data relevant to a telephone call on a user device 110. User device 110 is can communicate with at least a telephone service 120 and a data gateway 130. In some embodiments, the user device 110 can use a single means of communication to connect to telephone service 120 and data gateway 130. In other embodiments, telephone service 120 and data gateway 130 can be co-located, or can exist as a single device facilitating both functions. In some embodiments, telephone service 120 and/or data gateway 130 can be one or more service control points (SCP) or similar nodes. User device 110 can employ multiple means of communication, to include any means of voice and data transmission. In still other embodiments, telephone service 120 can represent a telephone switch, service control point, service switching point, service transfer point, and similar node, or a plurality thereof.

User device 110 exchanges messages by receiving data from another user or device, or sending data to another user or device. In example system 100, an operator of user device 110 can receive or locate further information relating to other communication parties with which the user device 110 exchanges messages. Data gateway 130 can access database 140. Database 140 can be a single database or a plurality of databases. Database 140 can exist in a single location as a private or proprietary database, or a distributed database such as a local area network or the Internet. Database 140 can be co-located with data gateway 130, or both components can be embodied in a single component. It is to be understood that database 140 need not be a single component, but is used to represent any non-locally stored (e.g., in-the-cloud storage) information available to an operator of user device 110 through available components and infrastructure. Database 140 can be a distributed system or network, or a means for searching or managing such distributed system or network. Alternatively, or in addition, database 140 can be a proprietary database (e.g., corporate directories and commercial compilations) or traditional calling name database similar to those used by phone companies to enable Calling Name caller identification on landline telephones.

After user device 110 engages in communication, information about the communication can be discovered from querying database 140. In some embodiments, the communication can be a telephone call received or dialed. In some embodiments, the communication can be a text-based communication, such as a text message or e-mail. In other embodiments, the communication can be a multimedia or mixed-content message. Querying database 140 involves at least requesting information relating to another party or a plurality of parties with whom an operator of user device 110 is communicating with or has communicated with. At least the other parties' known identifying information (as described above) is included in the query of database 140. Information germane to the parties or communication from database 140 is returned to user device 110.

Figure 2:
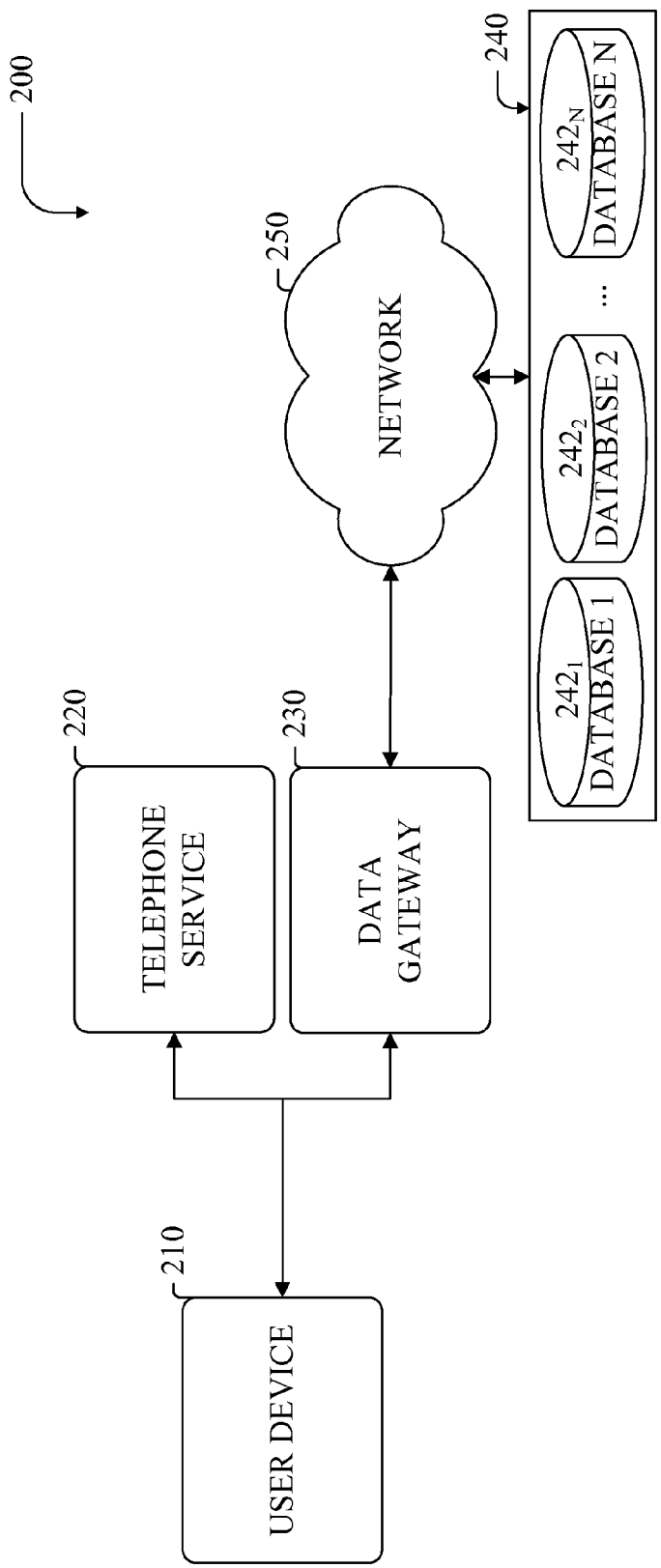
FIG. 2 shows general components and infrastructure utilized in a data network implementation of a system disclosed herein.

FIG. 2 illustrates an additional example system 200 that facilitates returning information to user device 210 during communication with other user devices. Data gateway 230 provides access to network 250. Network 250 can be a single network or plurality of networks. Network 250 in turn provides access to plurality of databases 240 (e.g., a datawarehouse), which includes a set of N databases $242_1$-$242_N$ (N is a positive integer). It should be appreciated that one or more of telephone service 220, data gateway 230, plurality of databases 240 and network 250 can be co-located or realized through a single component.

In an aspect of the subject innovation, when data gateway 230 is an Internet gateway providing access to the Internet network 250, plurality of databases 240 can be substantially any stored information, as it is understood that search engine and aggregation services (e.g., Google, Yahoo!, the Internet Archive, torrents, and peer-to-peer services) can query, cache or otherwise utilize virtually any document or file on the Internet. It is further understood that example system 200 is not limited to querying data through a single means where multiple means are available. The user device 210, data gateway 230, plurality of databases 240, and network 250 can all be enabled to request or perform one or more queries. It is noted that telephone service 220 can also perform or facilitate queries. Queries can be performed with more than one search, index and request to locate other results or compare similar results. Multiple queries can be performed in the same manner on a single database (e.g., several Google searches on one domain), or multiple means of query can be employed on a single database within plurality of databases 250 (e.g., Yahoo! search and a software index search on a single domain). The same query options can be extended to more than one or all databases within the plurality of databases 250.

Figure 3:
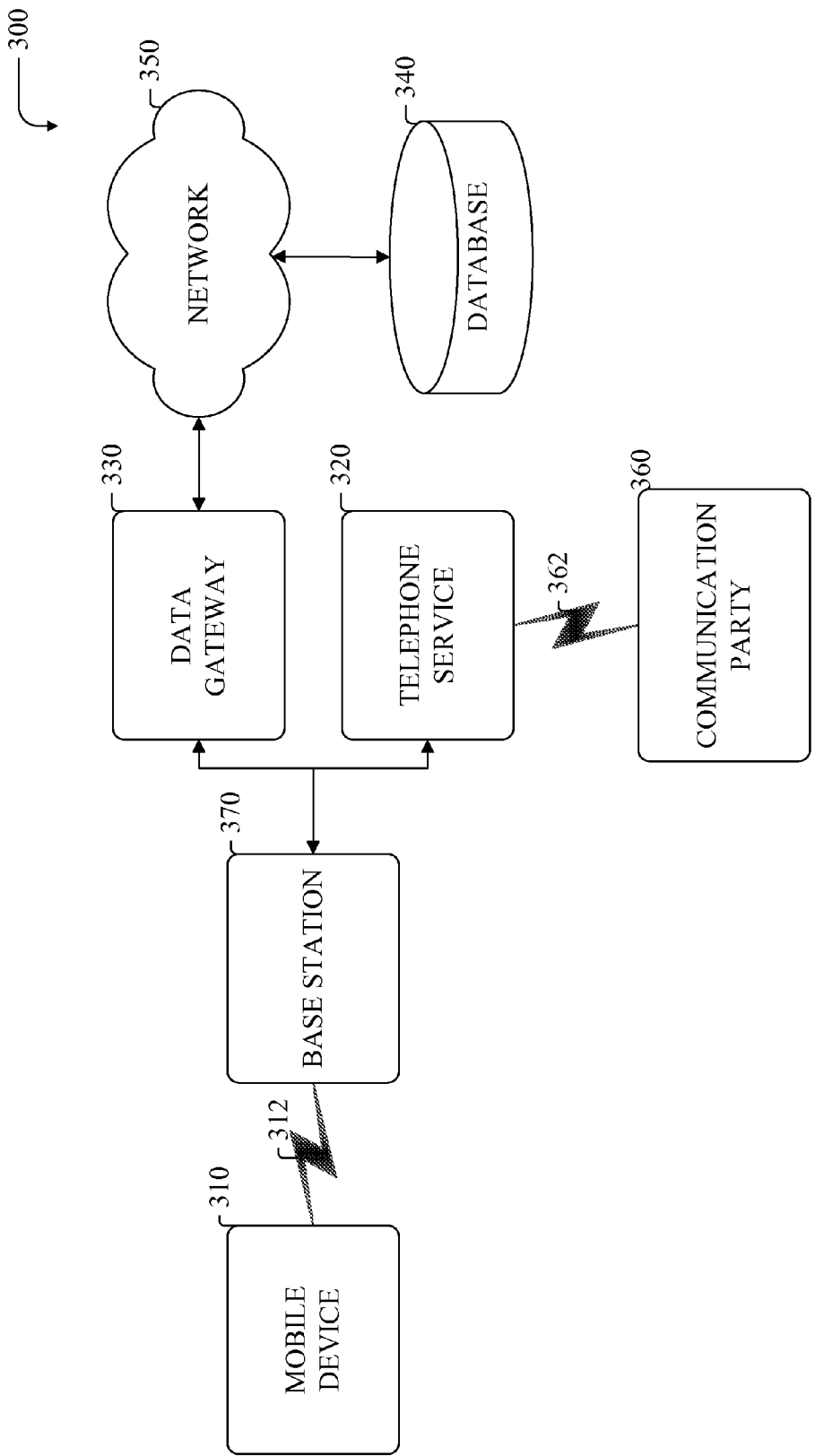
FIG. 3 shows an embodiment of a system disclosed herein in the context of a wireless telephone.

Turning now to FIG. 3, an example system 300 for returning information relevant during mobile communications is illustrated. Mobile device 310 can be a cellular telephone, smart phone, PDA, pager, radio component, or other mobile unit capable of transmitting and receiving information. Mobile device 310 is understood to have a user interface (including means for display and control) and at least one means for communication. In some embodiments, mobile device 310 can additionally include means for storage (local, remote, and/or distributed fixed and/or removable media). Mobile device 310 connects to telephone service 320 and data gateway 330 via base station 370.

In the illustrated example, communication party 360 can place a call (e.g., a voice call or data session) via communication link 362 to an operator of mobile device 310. In alternative embodiments, an operator of mobile device 310 can dial communication party 360, or either party could initiate another electronic correspondence (e.g., communication as described above). In conventional systems, mobile device 310 typically displays the telephone number of communication party 360. System 300 enables mobile device 310 to receive and provide substantially richer information related to communication party 360 through data returned from database 340. In example system 300, when communication party 360 dials an operator of mobile device 310, the call is routed through the telephone network using telephone service 320. A call utilizing telephone service 320 is routed through to base station 370 which maintains a wireless communication link 312 with mobile device 310. It is understood that base station 370 can be a plurality of base stations if mobile device 310 is in handoff or has completed handoff. In some embodiments, base station 370 can represent multiple base stations where mobile device 310 transitions between areas of coverage (or undergoes handoff). A telephone call from communication party 360 will generally only include information relating to number from which communication party 360 is calling. Example system 300 facilitates querying database 340 to discover further information relating to the telephone number currently associated with communication party 360.

In some embodiments, base station 370 is enabled to initiate a query of database 340 on behalf of mobile unit 310 when incoming communication from communication party 360 is received. In other embodiments, the query can be performed by another component of the system, such as data gateway 330, in which case base station 370 can pass notification of the pending communication to data gateway 330 to initiate a query. In still other embodiments, mobile device 310 initiates a query after receiving a transmission request or other data notifying communication from base station 370.

Once query of database 340 is complete, the results of the query are returned to network 350, through data gateway 330, to base station 370. In some embodiments query results can be directed to base station 370 via telephone service 320 if possible or another component besides or in addition to data gateway 330. Base station 370 can then transmit the query results to mobile device 310 using an existing communication channel or another channel that becomes available. The results of the query of database 340 can be transmitted at any time after the communication is initiated. In the situation where the communication between an operator of user device 310 and communication party 360 is a telephone call, mobile device 310 could be provided with query results immediately before the call is answered, during the call, and after the call is terminated. Alternatively, the query results could be saved presented or recalled at a later time.

Figure 4:
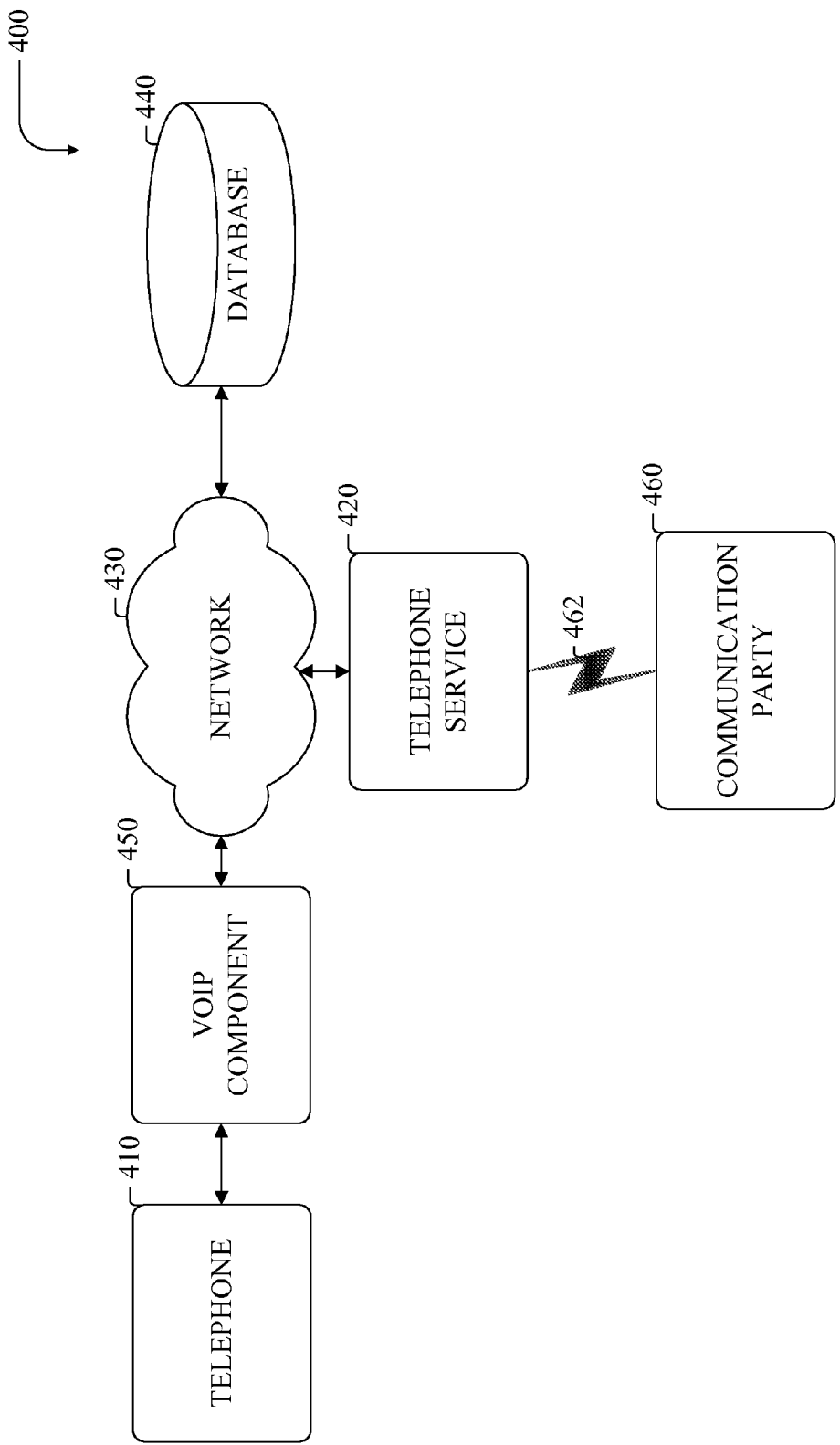
FIG. 4 shows an embodiment of a system disclosed herein in the context of a Voice over Internet Protocol telephone.

Turning now to FIG. 4, an example system 400 is illustrated whereby additional information such as calling name is provided to users of Voice-over-Internet-Protocol (VOIP) systems. In embodiments, system 400 can also be applied to SIP phone systems. In some VOIP systems, calling name or data other than the number or address of a communication participant was only available if the communication participant was a member of the same service or if the VOIP service had access to a proprietary database similar to those employed by traditional phone companies. System 400 allows utilization of network 430 to query database 440 while concurrently establishing the VOIP telephone link through telephone service 420.

In one embodiment, communication party 460 places a call to an operator of telephone 410. Communication party 460 can initiate or receive communication via communication link 462. If communication party 460 is utilizing a traditional landline telephone, the call will be routed through telephone service 420, eventually to network 430. VOIP component 450 receives the call through network 430, and notifies an operator of telephone 410. Telephone 410, VOIP component 450, software or hardware associated with network 430, or any combination thereof, can initiate a query of database 440 using network 430. In some embodiments, VOIP component 450 or telephone 410 can have additional communication means beyond network 430, which can also be employed to initiate a query. Additionally, some embodiments can enable another device (e.g., personal computer) to manage call information or initiate a query. Information about communication party 460 discovered via database query is returned to an operator of user telephone 410. Query results can return by the same path of the query request, or by any other communication means available. Query results can be display on telephone 410 as caller identification information, or on any other display interface available to an operator of telephone 410 sharing communication links with other components of system 400. Query results can be displayed simultaneously with notification of a call, during a call, after a call, or at a later time when requested by an operator of telephone 410.

In another embodiment, telephone 410 places a call to communication party 460. As described in the above embodiment, telephone 410, VOIP component 450, or components of network 430 can query database 440 for information relating to communication party 460 to return to the operator of telephone 410. Query results are returned to an operator of telephone 410. In one embodiment, query results can be returned to an operator of telephone 410 who is dialing as soon as dialing is complete. In other embodiments, results can be returned to an operator of telephone 410 during the call, after the call, or can be accessed at a later time.

Telephone 410 and VOIP component 450 will collectively include at least user control and display interfaces, storage, and connectivity to network 430. In some embodiments, telephone 410 represents multiple telephones sharing a common line of communication. VOIP component 450 can include, but is not limited to, analog terminal adapters (ATAs), personal or distributed computers, modems, routers, hubs, and common components of telephone or network systems, realized through hardware, software or a combination thereof.

In an aspect of the subject innovation, telephone service 420 can provide a VOIP interface (not shown) which can facilitate an all-VOIP communication among parties that utilize network-based voice communication(s). In other embodiments, VOIP component 450 can be integrated into other components, or alternatively can comprise a plurality of components. While illustrated example system 400 is directed toward a diverse communication that employs both VOIP and traditional landline telephones, it is to be appreciated that extensions to example system 400 can allow communication via other arrangements or analogous communication services (e.g., Skype™, Ventrilo, signal repeaters such as Radio over Internet Protocol, corporate voice systems, click-to-talk, et cetera). Similarly, example system 400 also can be extensible to non-voice communications (e.g, data sessions) over one or more networks. In some embodiments, example system 400 can provide data relevant to communication party 460 not only for realtime voice communication, but also for other communication (as communication is described above) routed through network 430. It is additionally understood that some telecommunications networks can include additional components not illustrated in system 400, and can combine or exclude components illustrated in system 400, while still enabling substantially equivalent functionality.

Figure 5:
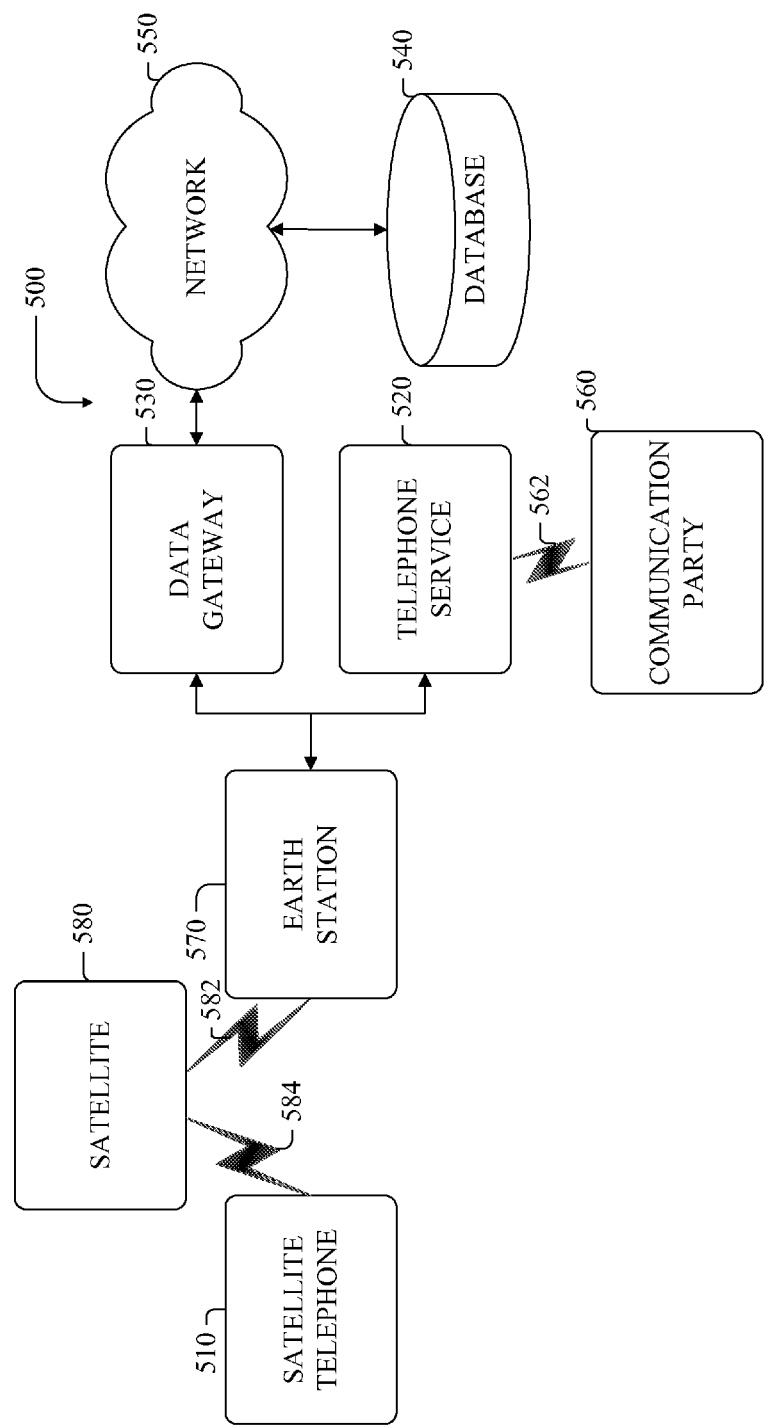
FIG. 5 shows an embodiment of a system disclosed herein in the context of a satellite telephone.

FIG. 5 illustrates yet another example system 500 which facilitates additional information related to a communication provided to an end-user of satellite phone 510. Satellite phone 510 engages in two-way communication with satellite 580 via communication link 584. Satellite 580 also engages in two-way communication with earth station 570 via communication link 582. Earth station 570 provides access to data gateway 530 and telephone service 520. Telephone service 520 enables connection to users of traditional landline telephones or users employing alternative telephone systems. Communication party 560 is engaged in communication with satellite phone 510, and can utilize a mobile communication device or a non-mobile communication device communicating in part via communication link 562. Data gateway 530 allows communication with users engaged in correspondence via data transmissions. Data gateway 530 additionally enables access to network 550, which in turn provides access to database 540. Database 540 is for information relating to communications in which the operator of satellite phone 510 participates.

Communication link 584 and communication link 582 provide satellite support to satellite phone 510 and earth station 570. Example system 500 can utilize applications requiring satellite support via communication link 584 and 582. For example, satellite phone 510 is not constrained to any particular network to perform lookup of information relating to communication party 560. Support for information lookup is thus universal and independent of available local networks. Satellite 580 can also provide enhanced location based services and other features commonly associated with satellite uplink.

It is understood that system 500 is illustrative, and substantially analogous systems can include other known components not pictured in system 500. Analogous systems can also exclude or combine components pictured in system 500. For example, satellite 580 can facilitate direct communication between satellite phone 510 and another satellite-enabled device. In one such embodiment, satellite 580 can still connect to earth station 570 to facilitate access to data gateway 530 and network 550 to query database 540 for further information relating to a communication utilizing satellite phone 510. In other embodiments, additional relays can be used to transmit a signal. In one such embodiment, satellite 580 can represent a plurality of satellites, or earth station 570 can represent a plurality of earth stations. In embodiments where satellite 580 represents a plurality of satellites, or in embodiments where earth station 570 represents a plurality of earth stations, such pluralities can perform relay functions, facilitate retention of coverage (e.g., through handoff), and provide overlapping coverage (e.g., overlapping satellite beams, earth station coverage areas).

Figure 6:
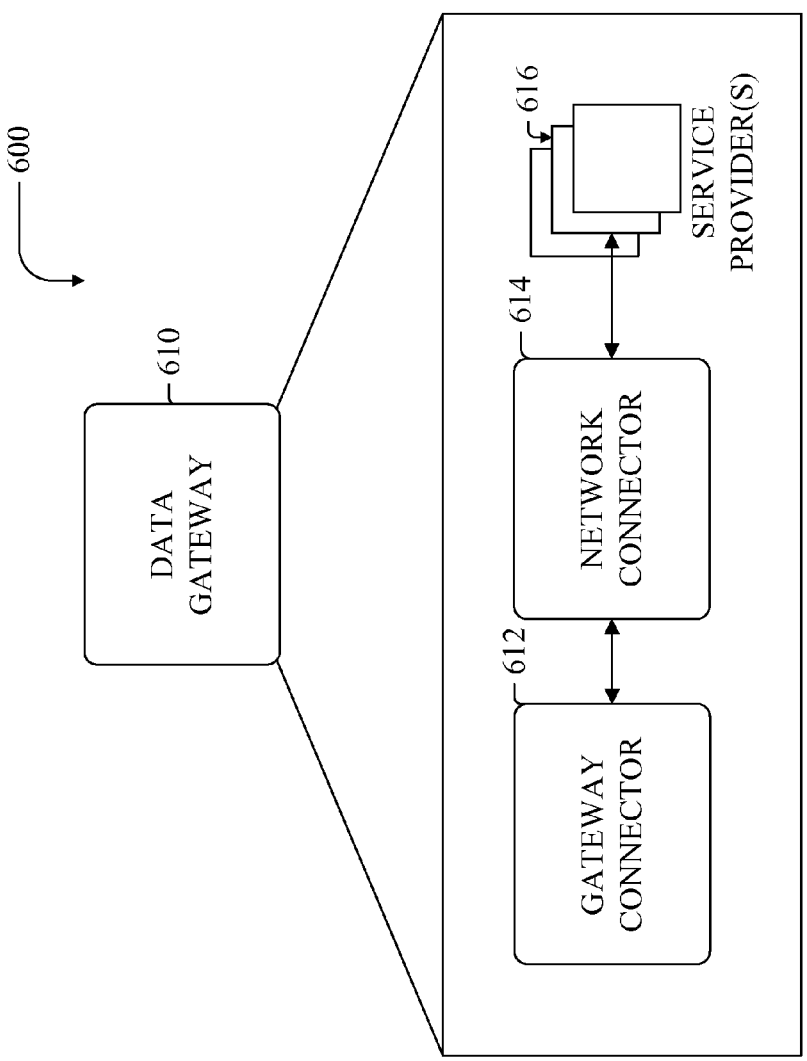
FIG. 6 shows features of a data gateway which can be employed by a system disclosed herein.

Turning now to FIG. 6, an example embodiment 600 a data gateway is illustrated in accordance with aspects of the subject innovation. As discussed supra, several components utilized in one or more embodiments can be combinations of a plurality of components, or advantageous expansions or modifications of a single component. For example, in some embodiments of example systems described herein, data gateway 610 can include a gateway connector 612 and a network connector 614 bridging a connected device to service provider 616. In some embodiments, gateway connector 612 connects to a data gateway or base station which relays network transmissions to a user device elsewhere. In other embodiments, a user device can connect directly to gateway connector 612. Gateway connector 612 then provides the link for any external devices to network connector 614, which provides access to service provider 616. Service provider(s) 616 can represent one or more service providers, including but not limited to home or corporate networks, commercial Internet services such as America Online™ or NetZero™, another means of connecting to the Internet, remote system access, peer-to-peer or ad hoc networks, and distributed computing environments. System 600 is only one example of how substantially analogous systems can include or exclude certain components to the accomplishment of these ends.

By employing gateway connector 612 and network connector 614, data gateway 600 is provided access to networks otherwise not available. Further, gateway connector 612 and network connector 614 facilitate access to content specific to service provider(s) 616. For example, if any one of service provider(s) 616 allows access to a provider database (e.g., member directory, private knowledge-base, private storage), data gateway 600 now provides a link to such provider content. In this way, data gateway 600 can facilitate information lookup in both public and non-public databases.

FIG. 7 includes a system 700 illustrating one embodiment of a possible user interface to display information resulting from database query about an incoming or outgoing call or communication. User device 710 includes device display 712. When user device 710 is engaged in communication, device display 712 shows telephone number 714, as in conventional systems. Telephone number 714 can be any telephone number from any country and in any format supported by user device 710. Telephone number 714 additionally need not be a telephone number where communication is not a telephone call or SMS message. For example, where user device 710 is engaged in instant messaging or e-mail, an address or user name can be substituted. In addition to telephone number 714, device display 712 can also show a name 716 associated with telephone number 714. Name 716 can be, but is not limited to, an individual name, family name, business or organization name, title, and other string of characters associated with the number or address associated with the communication.

In the same manner, some embodiments can also display further information 718 when it is discoverable via the available query means. For example, search engines such as Google or Yahoo! include directories which can display phone numbers and addresses for certain users in a variety of databases. In addition, these search engines have access to sites containing business and biographical information, and maps and other location based services. In system 700, further information 718 can display an address associated with the phone number of name involved in the communication, or can enable the user to search until such information is returned. Further information 718 can also contain more general information gleaned from an area or country code associated with the telephone number. In embodiments utilizing system 700 with other means of communication, at least a portion of further information 718 could be inferred from an originating or target domain or messenger service.

Further information 718 could employ returned biographical information to provide additional details, such as, but not limited to, occupation (e.g., musician), organization or family information, relevant news items, associations, known relations, and any number of other recordable attributes from available public or private databases. Embodiments combined with social networking technologies can display common acquaintances or other relations in further information 718. Some embodiments can also implicitly link known entities by proximity (e.g., same area code, zip code, network address, et cetera) and other means.

Where either specific or general location information is included in further information 718, some embodiments can include location based services to increase the functionality of the interface provided on the device display 712. If user device 710 includes self-locating technology (e.g., devices enabled to utilize GPS, signal propagation, and triangulation techniques), further information 718 can include the ability to plan a route to a referenced location. In embodiments which do not include self-locating technology, further information can enable operators of user device 710 to generate directions with additional input. Further information 718 can also include functionality to locate points of interest nearby a referenced location.

In some embodiments, items displayed on device display 712 (e.g., telephone number 714, name 716, further information 718) will be selectable to locate additional information on any particular item. Some embodiments can include buttons 720 (or other selectable display items including but not limited to links, menus, windows and tabs) to request further information about a particular display item. In some embodiments, the items (e.g., telephone number 714, name 716, further information 718) themselves can be selectable links. Specific embodiments can allow items to be selected at different times or at any time. For example, some embodiments can allow an operator of user device 710 to select items as soon as a communication is received but before answering. Other embodiments can also allow, or exclusively allow, an operator of user device 710 to select items after answering a communication, during communication, after communication, or at a later time.

In some embodiments, the operator of user device 710 can prefer to display specific information about another party to a communication. For example, user device 710 or components connected to user device 710 can already include or have access to stored information (e.g., in an address book, directory, contact history, cache) relating to a specific telephone number or address (e.g., name, nickname, specific biographical, business, or location information). In some embodiments, such information can be preferred over other information located in a queried database, and can be displayed on device display 712 prior to querying a database for additional information, or regardless of what information is returned from a database query. In other embodiments, where only certain stored information is preferred, unused portions of device display 712 can still show more information discovered as a result of a database query.

Turning now to FIG. 8, example method 800 is illustrated for providing a user device engaged in communication with additional information relating to that communication. At 810, a communication is set up. The communication set up at 810 can be any interparty communication as described above. In some embodiments, method 800 is applied to multiple parties in a communication involving more than two parties.

At 820, a database is queried. At least a portion of the query terms can include at least a portion of identifying information (as described above) for another party to the communication set up at 810. In some embodiments, more than one database can be queried. In some embodiments, more than one query can be processed on one or more databases. In embodiments processing multiple queries, more than one means of query can be utilized. The database query at 820 can return information relating at least in part to the identifying information of another party to the communication. At 830, a determination is made as to whether relevant information has been returned via the database query at 820. If database query 820 fails to return acceptable results, default information is displayed at 840. Default information displayed at 840 can include the identifying information used in the database query.

Conversely, if the query results contain relevant information, such database information is displayed at 850. The display can exhibit results similarly, or can present specific items in different formats. In addition to aesthetic features, display of database information at 850 can be altered or formatted to facilitate compatibility according to resources and settings, such as but not limited to available user device hardware, screen area, controls, and explicit or inferred system or network preferences.

FIG. 9 illustrates example method 900 providing an alternative, or additional, embodiment of a methodology for querying information relating to a party to a communication. A communication is set up at 910. At 920, information at least in part including at least a portion of identifying information is compared against local or remote storage to determine if data is already known relating to the other party to a communication. Such data can exist on a user device, or on a component or network accessible to the user device. A party to a communication can be known literally or constructively; an operator of a user device can literally know a communication party and can store a name, nickname or other idiosyncratic information, organization, and other relevant information in a local or remote address book or other store associated with at least a portion of identifying information related to the party to the communication; or constructively, wherein previous query results can still be stored and easily recalled even if not committed to an address book or even actively viewed by the operator of the user device. If such information is discovered at 920, information from storage can be displayed at 940.

If no relevant information exists in existing storage, at 930 a database will be queried. At 950, it is determined whether relevant data was discovered via the database query. If not, default information will be displayed at 960. If relevant information is returned as a result of the database query at 930, the database information will be displayed at 970.

FIG. 10 illustrates another embodiment of an example method 1000 for providing information relating to a party to a communication. At 1010, a communication is set up. A determination is made at 1020 as to whether information relating to the party to the communication already exists in storage. If pertinent stored information exists, it can be displayed at 1030. If no stored information relating to the party to the communication exists, a database can be queried at 1040. At 1050, a determination is made as to whether data relating to the party to the communication was returned from the database. If data is not found, a default display can be shown at 1060. If applicable information is returned with the database query, these results can be stored at 1070. At 1080, the now-cached database query results can be displayed to an operator of a device. In another embodiment of example method 1000, the additional aspect of allowing an operator of a user device to browse through a query result history and save selected results can be included.

FIG. 11 illustrates example method 1100 for showing information relating to a communication according to user preferences. At 1110, a communication is set up. At 1120, a determination is made as to whether the user has a preference for display relating to this communication (based on e.g., type of communication, identifying information relating to another party of the communication, preferred display setup, et cetera). If a user preference exists, the display is presented at 1140 according to user preference. If no preference exists, a database query occurs at 1130. At 1150, a determination is made as to whether pertinent information was returned from the database query. If so, the database information can be displayed at 1170. If no relevant information is discovered via the database query at 1140, a default display can be presented at 1160.

FIG. 12 illustrates an embodiment of an example method 1200 for displaying additional data relating to information previously presented relating to a communication. At 1201 information relating at least in part to identifying information associated with a party to a communication is displayed. In some embodiments, the previously presented information can be decomposed before additional information is requested (e.g., search for more information about a particular area code, as opposed to the entire telephone number). Thereafter, further information can be requested. At 1210, it is determined if further information is requested. If no further information is requested, a user device can continue or resort to default behavior at 1220.

If, at 1210, a determination is made to seek further information, a search for additional information can proceed at 1230. Additional information can be requested with (e.g., clicking for 'More Info') or without (e.g., pull data similar to that of the last several calls) input from an operator of a user device. The search can occur utilizing any available database or storage. The database or storage can be a plurality of databases or storage, and combinations thereof, and can also be local, remote, and distributed across a combination of local and remote components. The search at 1230 can be one or more searches by one or more methods on one or more databases and storage components. A determination is made as to whether relevant information was discovered via the search at 1240. If no further information was found, a default display can be employed at 1250. If additional relevant information exists in the search results, the search data can be displayed at 1260. In some embodiments, the results of a request for additional information can display in a screen associated with the communication, a user interface or control screen. In other embodiments, a web browser, media player, content display component, and other applications can be utilized to navigate or exhibit additional information. In some embodiments, additional information can be cached or stored. Certain embodiments allow additional information to be appended to a communication underway or forwarded to another entity in a separate communication.

Figure 13:
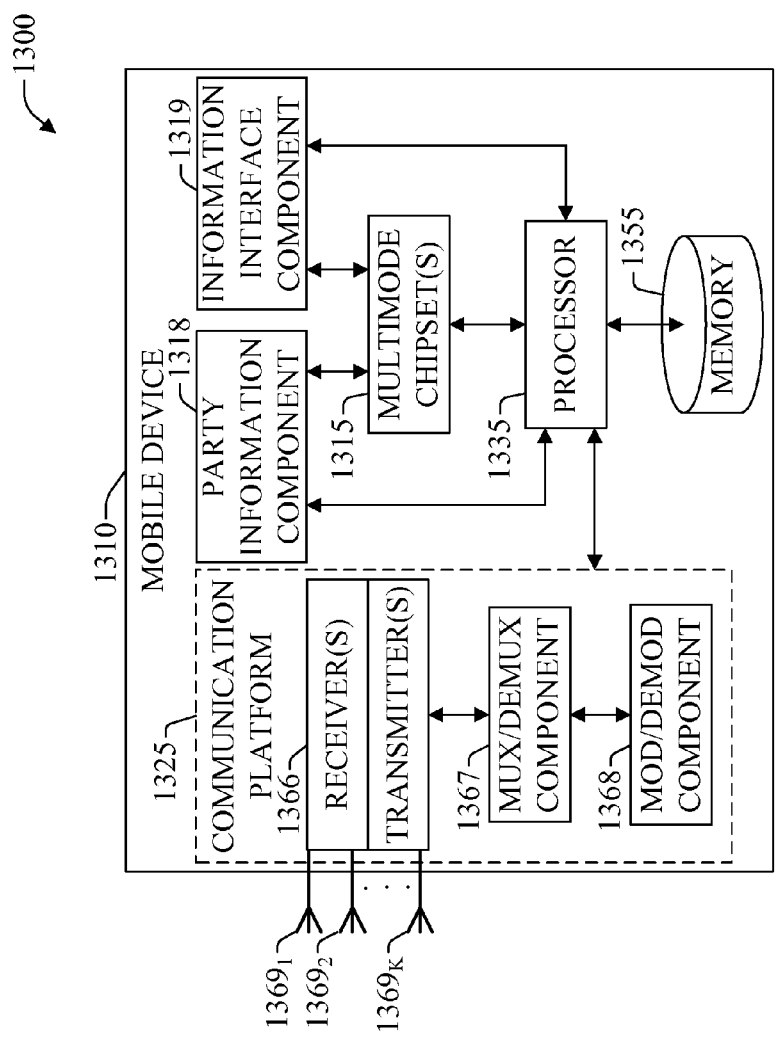
FIG. 13 illustrates a block diagram of an example embodiment of a mobile user device that can function in accordance with aspects described herein.
Figure 14:
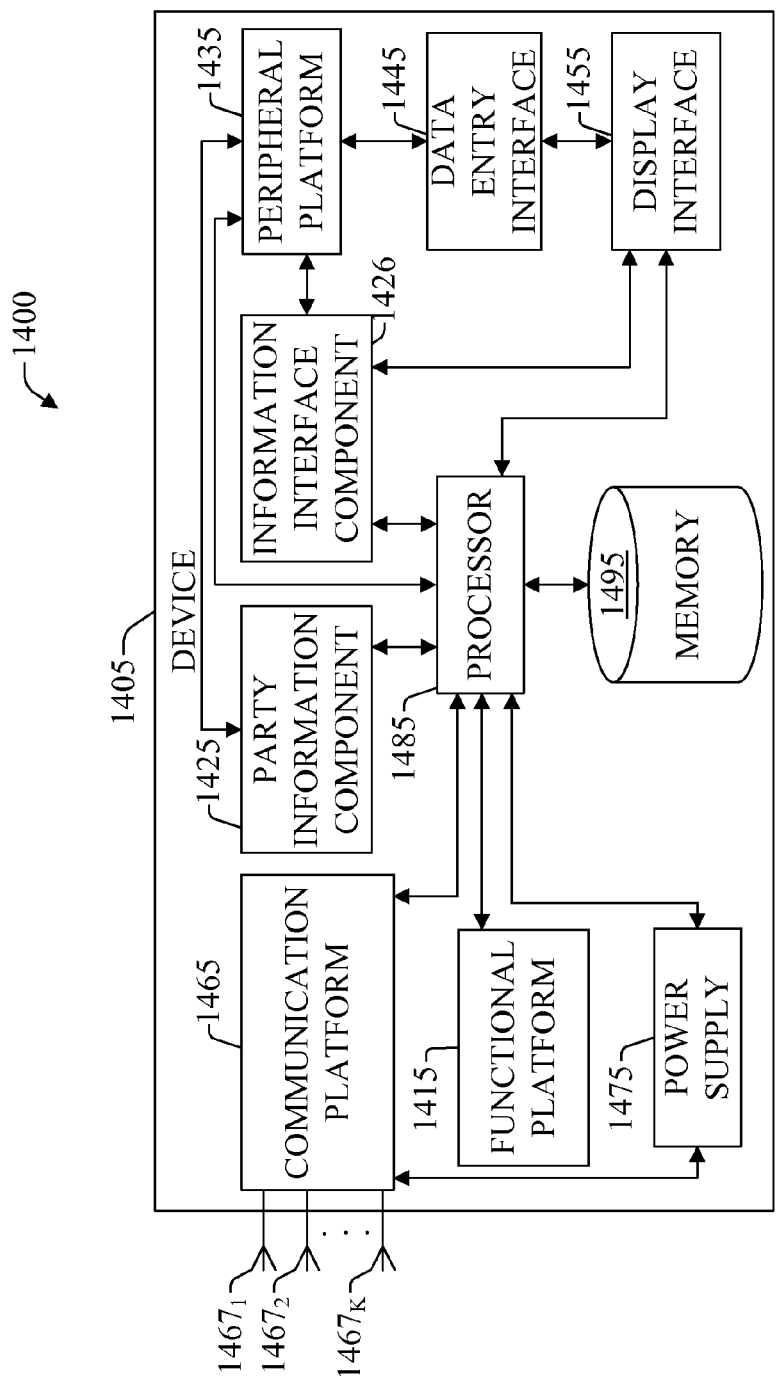
FIG. 14 is a block diagram of an example embodiment of a device that can function in accordance with aspects described herein.
Figure 15:
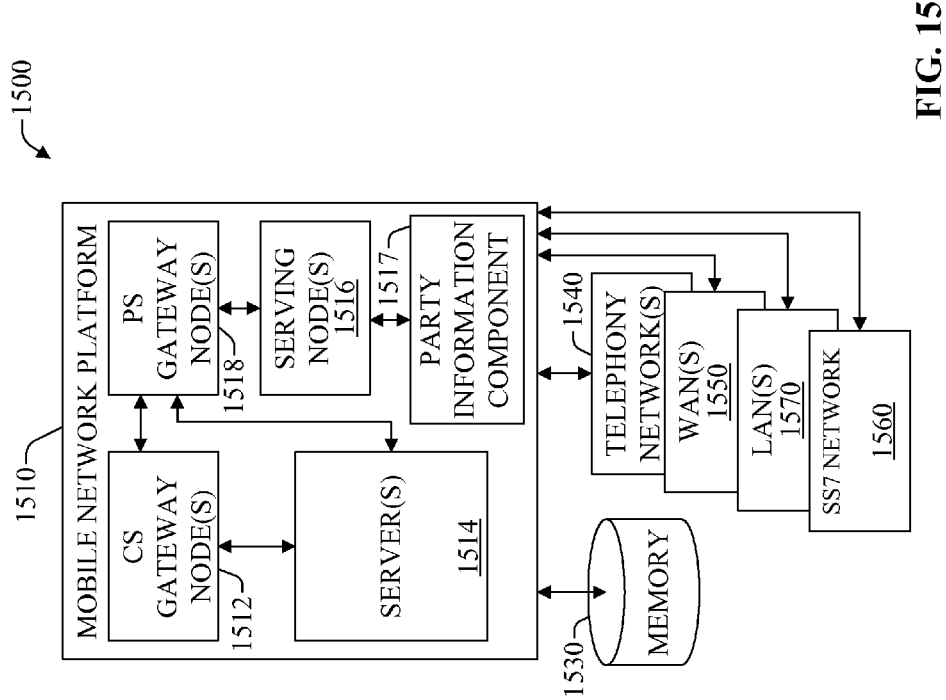
FIG. 15 presents a block diagram of an example embodiment of a network platform which functions in accordance with aspects described herein.

To provide further context for various aspects of the subject specification, FIG. 13 illustrates a block diagram of an example embodiment 1300 of a mobile device 1310 that can handle information relating to another communication party in accordance with aspects described herein. Additionally, FIG. 14 presents a block diagram of an example embodiment 1400 of a device 1405, which can be provisioned through a non-mobile network platform, and can manage information relating to another communication party as described herein. Furthermore, FIG. 15 presents an example embodiment 1500 of a mobile network platform 1510 which can facilitate communication and transmission of information relating to parties involved in the communication in accordance with aspects described herein.

In mobile device 1310, which can be a multimode access terminal, a set of antennas $1369_1$-$1369_K$ (K is a positive integer) can receive and transmit signal(s) from and to wireless devices like access points, access terminals, wireless ports and routers, and so forth, that operate in a radio access network, e.g., RAN 185. It should be appreciated that antennas $1369_1$-$1369_K$ are a part of communication platform 1325, which comprises electronic components and associated circuitry that provide for processing and manipulation of received signal(s) and signal(s) to be transmitted. In an aspect, communication platform 1325 includes receiver(s)/transmitter(s) 1366 that can convert signal from analog to digital upon reception, and from digital to analog upon transmission. In addition, receiver/transmitter 1366 can divide a single data stream into multiple, parallel data streams, or perform the reciprocal operation; such operations typically conducted in various multiplexing schemes. Functionally coupled to receiver(s)/transmitter(s) 1366 is a multiplexer/demultiplexer (mux/demux) component 1367 that facilitates manipulation of signal in time and frequency space. Electronic mux/demux component 1367 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1367 can scramble and spread information (e.g., codes) according to substantially any code; e.g., Hadamard-Walsh codes, Baker codes, Kasami codes, polyphase codes, and so on. A modulator/demodulator (mod/demod) component 1368 is also a part of communication platform 1325, and can modulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In an aspect of embodiment 1300, mod/demod component 1368 is functionally coupled to mux/demux component 1367.

In embodiment 1300, multimode operation chipset(s) 1315 allows mobile device 1310 to operate in multiple communication modes in accordance with disparate technical specification for wireless technologies. In an aspect, multimode operation chipset(s) 1315 utilizes communication platform 1325 in accordance with a specific mode of operation. In another aspect, multimode operation chipset(s) 1315 can be scheduled to operate concurrently (e.g., when K>1) in various modes or within a multitask paradigm.

Mobile device 1310 can include party information component 1318 and information interface component 1319 which can transmit and receive in accordance with and to facilitate aspects described in the subject specification.

Mobile device 1310 also includes a processor 1335 configured to confer functionality, at least in part, to substantially any electronic component within mobile device 1310, in accordance with aspects of the subject innovation. As an example, processor 1335 can be configured to execute, at least in part, instructions in multimode operation chipset(s) that afford multimode communication through mobile device 1310 like concurrent or multitask operation of two or more chipset(s). As another example, processor 1335 can facilitate mobile device 1310 to receive traffic (e.g., various data flows) and relay such traffic via communication platform 1325. As yet another example, processor 1335 can receive synchronization indications to maintain content synchronized with operation performed in a device (not shown) attached to mobile device 1310. It should be appreciated that processor 1335 can store (e.g., in cache memory) at least temporarily traffic received from either extension interface 1318 or communication platform 1325, or both. Moreover, processor 1335 facilitates mobile device 1310 to process data (e.g., symbols, bits, or chips) for multiplexing/demultiplexing, modulation/demodulation, such as implementing direct and inverse fast Fourier transforms, selection of modulation rates, selection of data packet formats, inter-packet times, et cetera. Memory 1355 can store data structures (e.g., metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets, cell IDs, and so on.

In embodiment 1300, processor 1335 is functionally coupled (e.g., through a memory bus) to memory 1355 in order to store and retrieve information necessary to operate and/or confer functionality, at least in part, to communication platform 1325, multimode operation chipset(s) 1315, extension interface 1318, and other operational aspects of multimode mobile device 1310.

FIG. 14 is a block diagram of an example embodiment 1400 of a device that can manage information relating to a communication party as described herein. Device 1405 includes a functional platform 1415 that comprises a set of components that provide, at least in part, one or more specific functionalities of the device 1405. Additionally, device 1405 includes a party information component 1425 and an information interface component 1426 in accordance with aspects described herein. Moreover, in an aspect, device 1405 can include a communication platform 1465 that can provide wireless communication capabilities in addition, or alternatively, to connectivity of device 1405 through wired links (e.g., Ethernet, USB, GPIB, RS-232, FireWire, optical or coaxial cable, or router (not shown)). With respect to wireless capability, in device 1405, which can be a multimode access terminal, a set of antennas $1467_1$-$1467_K$ (K is a positive integer) can receive and transmit signal(s) from and to wireless devices like access points, access terminals, wireless ports and routers, et cetera, that operate in a radio access network (e.g., RAN 185). Communication platform 1465 can exploit the set of K antennas $1457_1$-$1457_K$, (K is a positive integer) to establish communication within various modes such as single-input single-output, or multiple-input multiple output. Communication platform 1465 operates in substantially the same manner as communication platform 1325.

Additionally, in device 1405, a peripheral component 1435 can include, or facilitate connection to, additional devices such as printer(s), media player(s), wireless router(s), network interfaces, biometrics touch-pad(s), et cetera. In an aspect, to afford such connectivity, peripheral component 1435 can include jacks for one or more of Ethernet, USB, GPIB, RS-232, FireWire, optical or coaxial cable connectors. Additionally, display interface 1455 can be a part of functional platform 1415 (e.g., when device 1405 is a PC, an IPTV interface, a mobile, a backprojector component, a data projector . . . ). Display interface 1455 also can display functions that control functionality of device 1405, or reveal operation conditions thereof (e.g., light-emitting-diode (LED) indicator(s) of devices operable with a network and available for content transaction(s)). In an aspect, display interface 1455 can be a liquid crystal display (LCD), a plasma panel, a monolithic thin-film based electrochromic display, and so on.

It should be appreciated that device 1405 also can include a data entry interface 1445 that can allow an end user to perform at least one of (i) command device 1405 via configuration of functional platform 1415, (ii) interact with a provisioning network platform (e.g., an enterprise network platform) or with a mobile network platform.

Power supply 1475 can power-up device 1405 and substantially any component included thereon. It should be appreciated that alternative or additional embodiments of device 1405 may not include power supply 1475 and be powered via an attachment to a conventional power grid.

In embodiment 1400, device 1405 includes processor 1485 which can be functionally coupled (e.g., through a memory bus) to memory 1495 in order to store and retrieve information necessary to operate and/or confer functionality, at least in part, to client component 1425, and substantially any component thereon in accordance with aspects described herein; functional platform 1415, communication platform 1465 when device 1405 includes it; and substantially any other component of device 1405. In addition, in connection with communication platform 1465, device 1405 also includes a processor 1485 configured to confer functionality, at least in part, to substantially any electronic component within device 1405, in accordance with aspects of the subject innovation. As an example, processor 1485 can be configured to execute, at least in part, instructions in multimode operation chipset(s) that afford multimode communication through device 1405 like concurrent or multi-task operation of two or more chipset(s). It should be appreciated that processor 1485 can store (e.g., in cache memory) at least temporarily traffic received from communication platform 1425, or both. Moreover, processor 1485 facilitates device 1405 to process data (e.g., symbols, bits, or chips) for multiplexing/demultiplexing, modulation/demodulation, such as implementing direct and inverse fast Fourier transforms, selection of modulation rates, selection of data packet formats, inter-packet times, et cetera.

Memory 1495 can store data structures (e.g., metadata); code structure(s) (e.g., modules, objects, classes, procedures) or instructions, or substantially any type of software or firmware that processor 1485 can execute to provide functionality associated with functional platform 1415; network or device information like policies and specifications; code sequences for scrambling, spreading and pilot (e.g., reference signal(s)) transmission; and so on. Additionally, memory 1495 also can retain content(s) (e.g., multimedia files), historic data on content transaction(s), security credentials (e.g., passwords, encryption keys, digital certificates, biometric reference indicators like voice recordings, iris patterns, fingerprints), et cetera.

As indicate supra, FIG. 15 presents an example embodiment 1500 of a mobile network platform 1510 which can register transmit information relating to communication parties in accordance with aspects described herein. Generally, mobile network platform 1510 can include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, mobile network platform 1510 includes CS gateway node(s) 1512 which can interface CS traffic received from legacy networks like telephony network(s) 1540 (e.g., public switched telephone network (PSTN), or public land mobile network (PLMN)) or a SS7 network 1560. Circuit switched gateway node(s) 1512 can authorize and authenticate traffic (e.g., voice) arising from such networks. Additionally, CS gateway node(s) 1512 can access mobility, or roaming, data generated through SS7 network 1560; for instance, mobility data stored in a visited location register (VLR), which can reside in memory 1530. Moreover, CS gateway node(s) 1512 interfaces CS-based traffic and signaling and gateway node(s) 1518. As an example, in a 3GPP UMTS network, CS gateway node(s) 1512 can be embodied, at least in part, in gateway GPRS support node(s) (GGSN). In an aspect, CS gateway node(s) can embody, at least in part, gateway node(s) 165.

In addition to receiving and processing CS-switched traffic (e.g., content(s) that can be part of a content transaction) and signaling, PS gateway node(s) 1518 can facilitate PS-based data sessions with served (e.g., through RAN 185) mobile devices, or with other devices. Party information component 1517, which is substantially the same as the party information component described elsewhere herein, can utilize these and other components of mobile network platform 1510 to realize aspects disclosed herein. Data sessions can include traffic, or content(s), exchange with networks external to the mobile network platform 1510, like wide area network(s) (WANs) 1550; it should be appreciated that local area network(s) (LANs) 1570 can also be interfaced with mobile network platform 1510 through PS gateway node(s) 1518. It is to be noted that WANs 1550 and LANs 1570 can embody, at least in part, service network(s) 170. Packet-switched gateway node(s) 1518 generates packet data contexts when a data session is established. To that end, in an aspect, PS gateway node(s) 1518 can include a tunnel interface (e.g., tunnel termination gateway (TTG) in 3GPP UMTS network(s) (not shown)) which can facilitate packetized communication with disparate wireless network(s), such as Wi-Fi networks. It should be further appreciated that the packetized communication can include multiple flows that can be generated through service (e.g., provisioning) and application server(s) 1514. It is to be noted that in 3GPP UMTS network(s), PS gateway node(s) 1018 (e.g., GGSN) and tunnel interface (e.g., TTG) comprise a packet data gateway (PDG).

In embodiment 1500, mobile network platform 1510 also includes serving node(s) 1516 that convey the various packetized flows of data streams (e.g., content(s) that are part of content transaction(s)), received through PS gateway node(s) 1518. As an example, in a 3GPP UMTS network, serving node(s) 1516 can be embodied in serving GPRS support node(s) (SGSN). In an aspect, serving node(s) 1516 can embody, at least in part, service providers or networks as disclosed elsewhere herein.

Server(s) 1514 in mobile network platform 1510 can execute numerous applications (e.g., communication services, location services, online applications and entertainment, wireless device management, et cetera) that can generate multiple disparate packetized data streams or flows, and manage (e.g., schedule, queue, format . . . ) such flows. Such application(s), for example can include add-on features to standard services provided by mobile network platform 1510. Data streams (e.g., content(s) that are part of a content transaction) can be conveyed to PS gateway node(s) 1518 for authorization/authentication and initiation of a data session, and to serving node(s) 1516 for communication thereafter. As discussed above, PS gateways node(s) 1518 can convey the data streams (e.g., content(s)) to a device (e.g., device J 1050. Server(s) 1514 can also effect security (e.g., implement one or more firewalls) of mobile network platform 1510 to ensure network's operation and data integrity in addition to authorization and authentication procedures that CS gateway node(s) 1512 and PS gateway node(s) 1518 can enact. Moreover, server(s) 1514 can provision services from external network(s), e.g., WAN 1550, or Global Positioning System (GPS) network(s) (not shown). It is to be noted that server(s) 1514 can include one or more processor configured to confer at least in part the functionality of macro network platform 1510. To that end, the one or more processor can execute code instructions stored in memory 1530, for example. It is should be appreciated that server(s) 1514 can include a content manager 1515, which operates in substantially the same manner as described hereinbefore. Furthermore, server(s) 1514 can embody, at least in part, a party information component and an information interface component as disclosed elsewhere herein.

In example wireless environment 1500, memory 1530 can store information related to operation of mobile network platform 1510. Information can include data relevant to the party information component 1517; records of devices (e.g., $105_1$-$105_J$); and so forth. Memory 1530 can also store information from at least one of telephony network(s) 1540, WAN 1550, LAN 1570, or SS7 network 1560.

Various aspects or features described herein can be implemented as a method, apparatus, or article of manufacture using standard programming and/or engineering techniques. In particular, the aspects or features can be implemented through program modules stored in a memory and executed by a processor, and/or other combination of hardware and software, e.g., firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

As used in this application, the terms "component," "interface," "gateway," "connector," and "system" (and the like) are intended to refer to a computer-related entity, either hardware, a combination of hardware and software, software, or software in execution. For example, a component can be, but is not limited to being, a process running on a processor, a processor, an object, an instance, an executable, a thread of execution, a program, and/or a computer. By way of illustration, both an application running on a computer and the computer can be a component. One or more components can reside within a process and/or thread of execution and a component can be localized on one computer and/or distributed between two or more computers.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, et cetera), optical disks (e.g., compact disk (CD), digital versatile disk (DVD), et cetera), smart cards, and flash memory devices (e.g., card, stick, key drive, et cetera). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

As used herein, the term "identifying information" is intended to be contact information known at the time a communication is connected relating to a party of the communication and can include (but is not limited to) telephone numbers, aliases, messenger names and identifiers, e-mail addresses, extensions, device personal identification numbers (PINs), distribution lists, network addresses, component addresses (e.g., medium access control (MAC) addresses, machine addresses, et cetera) or other component identifiers, user names, nicknames, domains, signatures (electronic, physical, and otherwise), references, forwarding configurations, and network addresses. The term "communication" as used when two or more devices correspond is intended to expansively capture all means of transmission or reception available to state-of-the-art devices and can include (but is not limited to) cellular, satellite transmission, VOIP and SIP voice connections, short message service (SMS) exchanges, broadcast data, network sessions, e-mails, instant messages, other network-based messaging, PIN or other device-based messaging, voicemail, picture mail, video mail, mixed-content correspondence, Unified Messaging (UM), and other digital and analog information transmitted between parties in any local and/or distant, physical and/or logical region.

Similarly, the concept of "data transmission" herein is intended to broadly represent known means of information exchange with digital or analog systems, including but not limited to hard-wired and direct connections (e.g., local media, universal serial bus (USB) cable, integrated drive electronics (IDE) cable, category 5 cable, coaxial cable, fiber optic cable and telephone cable), shared connections (e.g., remote and/or distributed resources) wireless connections (e.g., Wi-Fi, Bluetooth, infrared wireless, and personal area network connections), messaging systems (e.g., short message service (SMS), instant messaging, and other network-enabled other messaging), mobile or cellular transmissions and combinations thereof (e.g., personal communication system (PCS) and integrated networks), Unified Messaging, and other means of techniques of communication employed by telephones, personal digital assistants (PDAs), computers and network devices. "Mixed-content message," as used herein, is intended to represent communications employing one or more means of data transmission to present one or more varieties of device-capable content, including (but not limited to) picture messages, audio or video messages, and messages where text or other media types accompany one another. A "user device" can include, but is not limited to, data-enabled telephones (cellular telephones, smart phones, soft phones, VOIP and SIP phones, satellite phones, telephones coupled to computer systems, et cetera), communications receivers, personal digital assistants, pagers, portable e-mail devices, portable web browsers, media devices capable of receiving data, portable computers, and other electronics that allow a user to receive communications from other parties.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the subject specification, terms such as "data store," "data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise historic data on previously served queries; communication party information from various sources; files and applications; and so forth. It is to be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of aspects of the claimed subject matter. It is, of course, not possible to describe every conceivable combination of components or methodologies for purposes of describing the claimed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim. Embodiments and examples provided in the foregoing are non-exhaustive and understood to capture similar functionality known as of the disclosures herein.

What is claimed is:

1. A system, comprising:
a memory to store instructions; and
a processor, communicatively coupled to the memory, that facilitates execution of instructions to perform operations, comprising:
retrieving party information about a communication party associated with a telephone number from which a call is initiated, wherein the retrieving the party information is performed based on
initiating a search of address book information, stored in a device at which the call is received, for the party information about the communication party; in response to determining that the party information is represented in the address book information, facilitating display of information from the address book information; and
in response to determining that the party information is not represented in the address book information, facilitating display of the party information received from query results retrieved from a public data store.

2. The system of claim 1, wherein the retrieving is based on contact information associated with the communication party.

3. The system of claim 1, wherein the operations further comprise:
querying the public data store for additional information relating to the party information.

4. The system of claim 3, wherein the querying is performed without a request for the additional information being received as input to the system.

5. The system of claim 3, wherein the operations further comprise:
facilitating an addition of the additional information to a display of the party information.

6. The system of claim 1, wherein the operations further comprise:
storing the party information for reuse in other communications comprising the communication party as a party.

7. The system of claim 1, wherein the operations further comprise:
enabling the communication party to opt-out of query service based upon which the displaying of the party information retrieved from the public data store is facilitated.

8. The system of claim 1, wherein facilitating includes facilitating selection of a portion of the party information that is displayed.

9. The system of claim 8, wherein the operations further comprise:
requesting additional information relating to the selection; and
facilitating displaying of the additional information relating to the selection.

10. The system of claim 1, wherein the facilitating the displaying is performed during the call.

11. The system of claim 1, wherein the facilitating the displaying is performed after termination of the call.

12. A non-transitory computer-readable storage medium storing computer-executable instructions that, in response to execution, cause a system comprising a processor to perform operations, comprising:
retrieving party information about a communication party associated with a telephone number from which a call is initiated, wherein the retrieving the party information is performed based on
initiating a search of an address book, stored at a device at which the call is received, for the party information about the communication party; in response to determining that the party information is stored in the address book, facilitating displaying of information is determined from the address book based on the search; and
in response to determining that the party information is not stored in the address book, facilitating displaying of the party information received from query results retrieved from a public data store.

13. The non-transitory computer-readable storage medium of claim 12, wherein the party information is not stored in the address book, and wherein the operations further comprise:
enabling selection of a portion of party information.

14. The non-transitory computer-readable storage medium of claim 13, wherein the operations further comprise:
requesting additional information relating to the selection.

15. The non-transitory computer-readable storage medium of claim 14, wherein the operations further comprise:
in response to receiving the additional information, further facilitating displaying of the additional information with the party information.

16. A method, comprising:
retrieving, by a system comprising a processor, party information about a communication party associated with a telephone number from which a call is initiated, wherein the retrieving is performed based on
initiating, by the system, a search of an address book, stored by a device at which the call is received, for the party information about the communication party; in response to determining that the party information is stored in the address book, facilitating, by the system, a display of information is received from the address book; and in response to determining that the party information is not stored in the address book, facilitating, by the system, a display of the party information received from query results retrieved from a public data store.

17. The method of claim 16, wherein the party information is not stored in the address book, and further comprising:

enabling, by the system, selection of a portion of the party information.

18. The method of claim 17, further comprising:

requesting, by the system, additional information relating to the selection.

19. The method of claim 18, further comprising:

facilitating, by the system, a further display of the additional information relating to the selection in connection with the display of the party information.

* * * * *